(12) United States Patent
De Costa

(10) Patent No.: US 6,971,418 B2
(45) Date of Patent: Dec. 6, 2005

(54) VACUUM OPERABLE CONTAINER FOR STORING FOOD

(76) Inventor: John D. De Costa, 320 Villa Espana Way, North Las Vegas, NV (US) 89031

( * ) Notice: Subject to any disclaimer, the term of this patent is extended or adjusted under 35 U.S.C. 154(b) by 0 days.

(21) Appl. No.: 10/751,187

(22) Filed: Jan. 5, 2004

(65) Prior Publication Data

US 2005/0145292 A1    Jul. 7, 2005

(51) Int. Cl.[7] ............................................. B65B 31/04
(52) U.S. Cl. ........................ 141/65; 141/82; 141/198; 99/472
(58) Field of Search ................................ 141/8, 65, 82, 141/98, 192, 198; 220/231; 99/357, 467, 99/472; 62/100, 127, 169, 268

(56) References Cited

U.S. PATENT DOCUMENTS

| | | | |
|---|---|---|---|
| 4,051,971 A | 10/1977 | Saleri et al. | |
| 5,142,970 A | 9/1992 | ErkenBrack | |
| 5,406,992 A | 4/1995 | Miramon | |
| 5,692,632 A | 12/1997 | Hsieh et al. | |
| D414,084 S | 9/1999 | Schmidt | |
| 5,964,255 A | 10/1999 | Schmidt | |
| 6,148,875 A * | 11/2000 | Breen | 141/65 |
| 6,598,517 B1 * | 7/2003 | McCausland | 99/472 |

\* cited by examiner

Primary Examiner—Timothy L. Maust

(57) ABSTRACT

A container for storing food in an air-tight atmosphere includes a housing having a generally rectangular shape and an opening formed therein for providing access to the interior of the housing, secured by a pivoting door. An electrically powered vacuum system is connected to the housing for selectively removing air therefrom. The vacuum system includes an air pump and a control button connected thereto for toggling the system between operable and non-operable modes. A plurality of valves are connected to the air pump for directing air inwardly and outwardly from the housing.

14 Claims, 4 Drawing Sheets the housing. The housing may further include at least one shelf selectively positionable within therein for supporting food thereon. The housing may further include a plurality of support members that are preferably formed from rubber. Such support members are connected to one of the plurality of sidewalls for maintaining the container at a substantially stable position during operating conditions.

VACUUM OPERABLE CONTAINER FOR STORING FOOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vacuum operable container and, more particularly, to a vacuum operable container for storing food.

2. Prior Art

Storing these foodstuffs in sealed containers preserves their freshness. The spoilage of the foodstuffs is accelerated by exposure to air, either through the effects of moisture in air, or the oxidative effects of atmospheric oxygen. Food is widely stored before and after use in closed, tightly sealed containers in an effort to preserve and extend the useful life thereof. Various sizes and shapes of sealed containers are widely used to contain and store food away from the components of air which cause oxidation and moisture spoilage. These sealed containers are normally used as simple closed vessels for holding the food away from exposure to air.

When food is stored in typical sealed containers there is usually accompanying air, which is trapped within the sealed container with any food contained therein. This accompanying air can have detrimental effects on the enclosed food. Thus, storage containers should be sealed around food and should be configured to allow the evacuation of the accompanying air from the space around the enclosed food. To be useful to the average consumer, such a container should also provide a mechanism for the evacuation of the air in the container, and this mechanism for evacuation should be convenient to use.

Accordingly, it is desirable to store food in the absence of gas, to avoid deterioration of food, which would occur because of chemical reactions between it and the gas.

BRIEF SUMMARY OF THE INVENTION

In view of the foregoing background, it is therefore an object of the present invention to provide a container for storing food in an air-tight atmosphere. These and other objects, features, and advantages of the invention are provided by a vacuum operable container including a housing that has a plurality of sidewalls integral with each other and forming a generally rectangular shape. The housing may further include a plurality of interior walls spaced from the plurality of sidewalls for defining a gap therebetween, which may partially extend about a perimeter of the housing.

The present invention further includes an air pump disposed within the gap and adjacent to the bottom surface of the housing. One of the plurality of sidewalls may have an opening formed therein for providing access to the interior of the housing. The housing may further include at least one shelf selectively positionable within therein for supporting food thereon. The housing may further include a plurality of support members that are preferably formed from rubber. Such support members are connected to one of the plurality of sidewalls for maintaining the container at a substantially stable position during operating conditions.

The present invention further includes a door having a longitudinal axis and a pair of opposed edge portions equally spaced therefrom and extending substantially parallel thereto. The door further has an end portion integral with the opposed edge portions. The door may be pivotally connected to the housing at the end portion, and may include a rear surface that could be formed from steel for being magnetically engageable with the housing. Of course, such a magnetic seal may be formed to have a soft outer surface, similar to a refrigerator cushion gasket, so that a secure contact can be maintained with the housing. The door may further include a handle connected to thereto and extending outwardly therefrom, to which the control button may be connected.

The present invention may further include an electrically powered vacuum system connected to the housing for selectively removing air therefrom as desired by a user. The vacuum system includes an air pump and a control button connected thereto for selectively toggling the system between operable and non-operable modes so that a user can simultaneously release the air pressure within the housing. The system further includes a plurality of valves connected to the air pump for directing air inwardly and outwardly from the housing respectively. The plurality of valves include an intake valve that may have an upper end portion connected to one of the plurality of interior walls, and an outlet valve that may have a lower end portion connected to one of the plurality of sidewalls. A pressure sensor is also included in the housing and is operably connected to the air pump for identifying the pressure contained within the housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
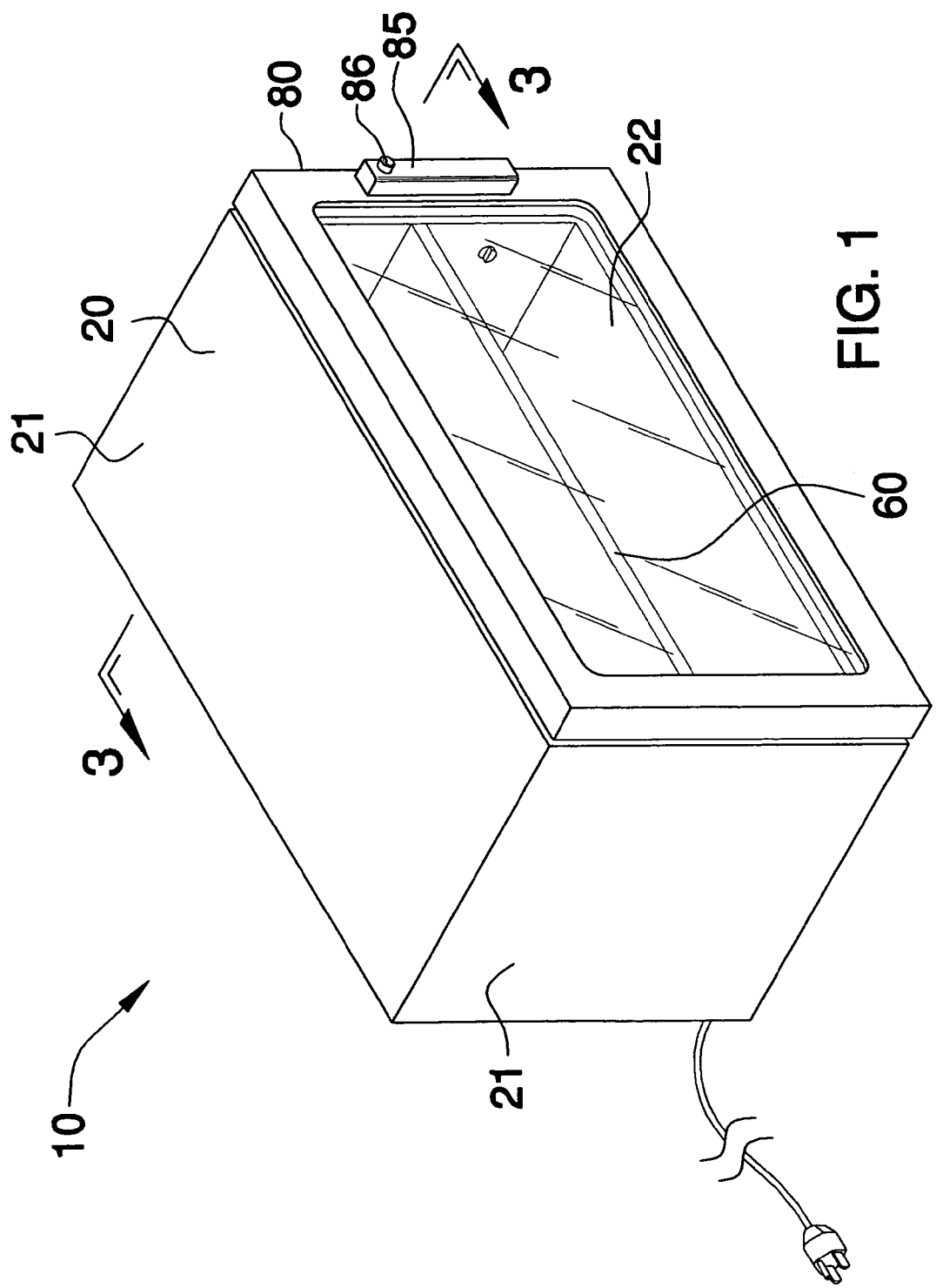
FIG. 1 is a perspective view showing a vacuum operable container for storing food, in accordance with the present invention.
Figure 2:
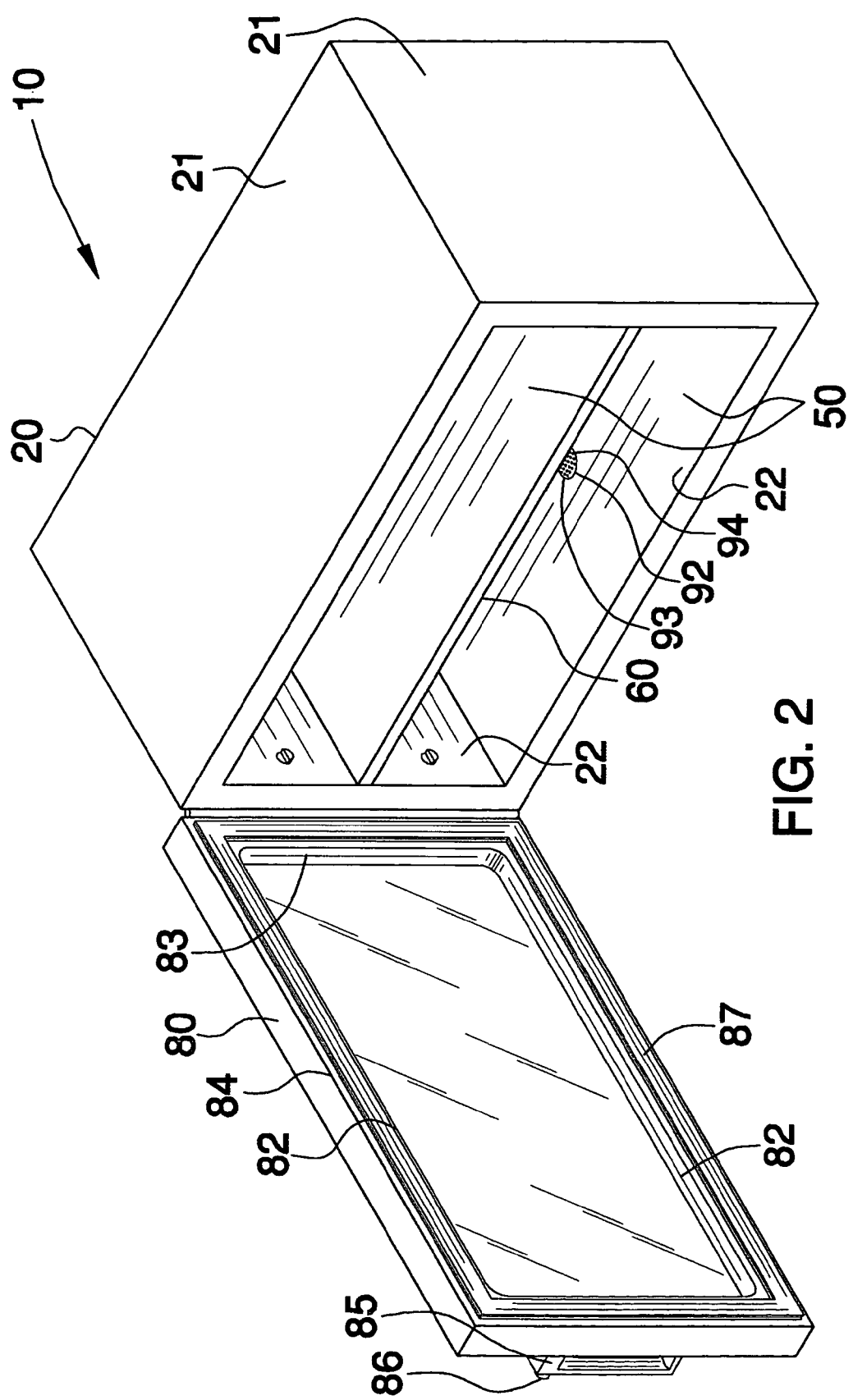
FIG. 2 is a perspective view showing the vacuum operable container of FIG. 1 in an open position.
Figure 3:
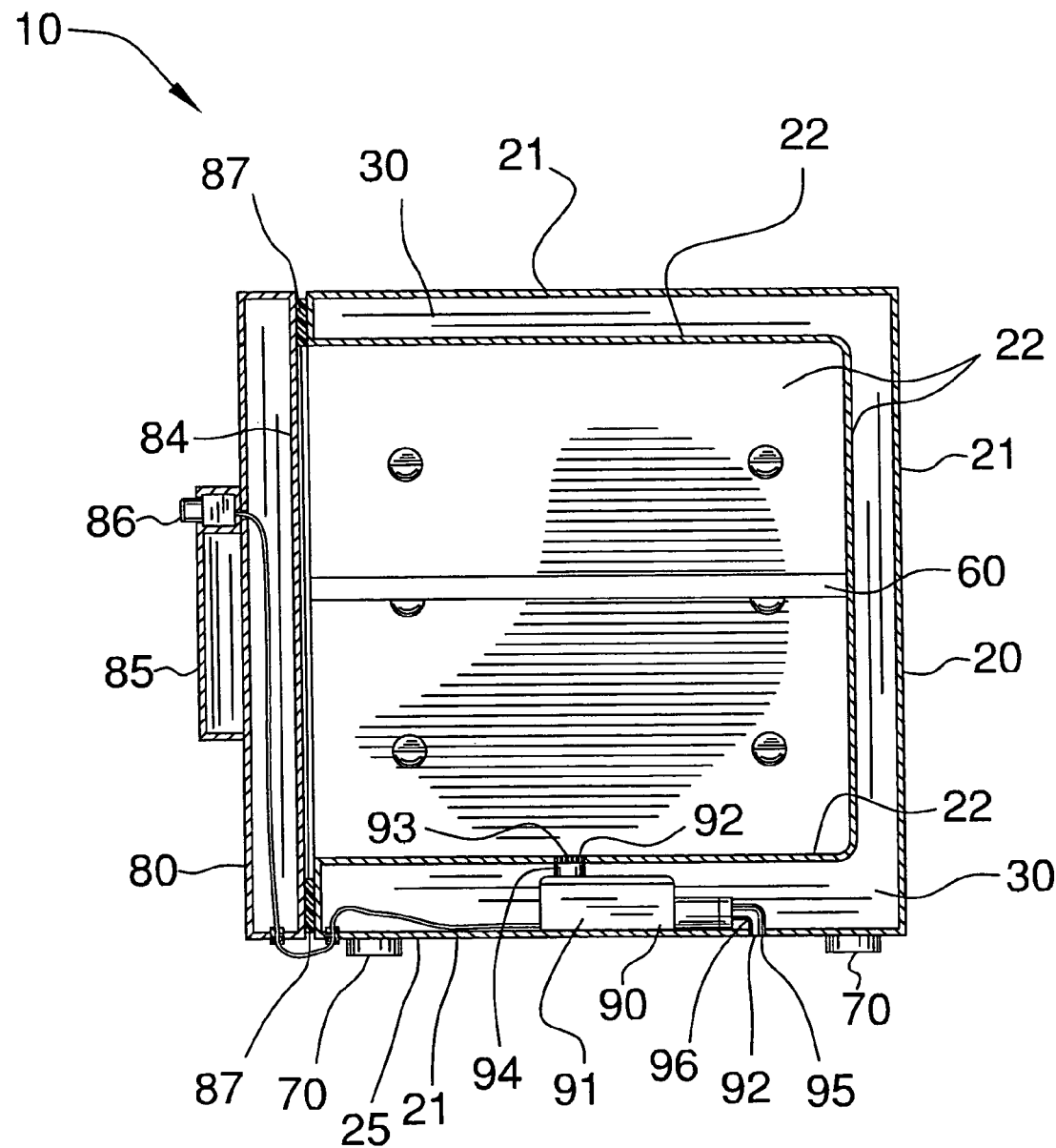
FIG. 3 is a cross-sectional view of the device shown in FIG. 1, taken along line 3—3.
Figure 4:
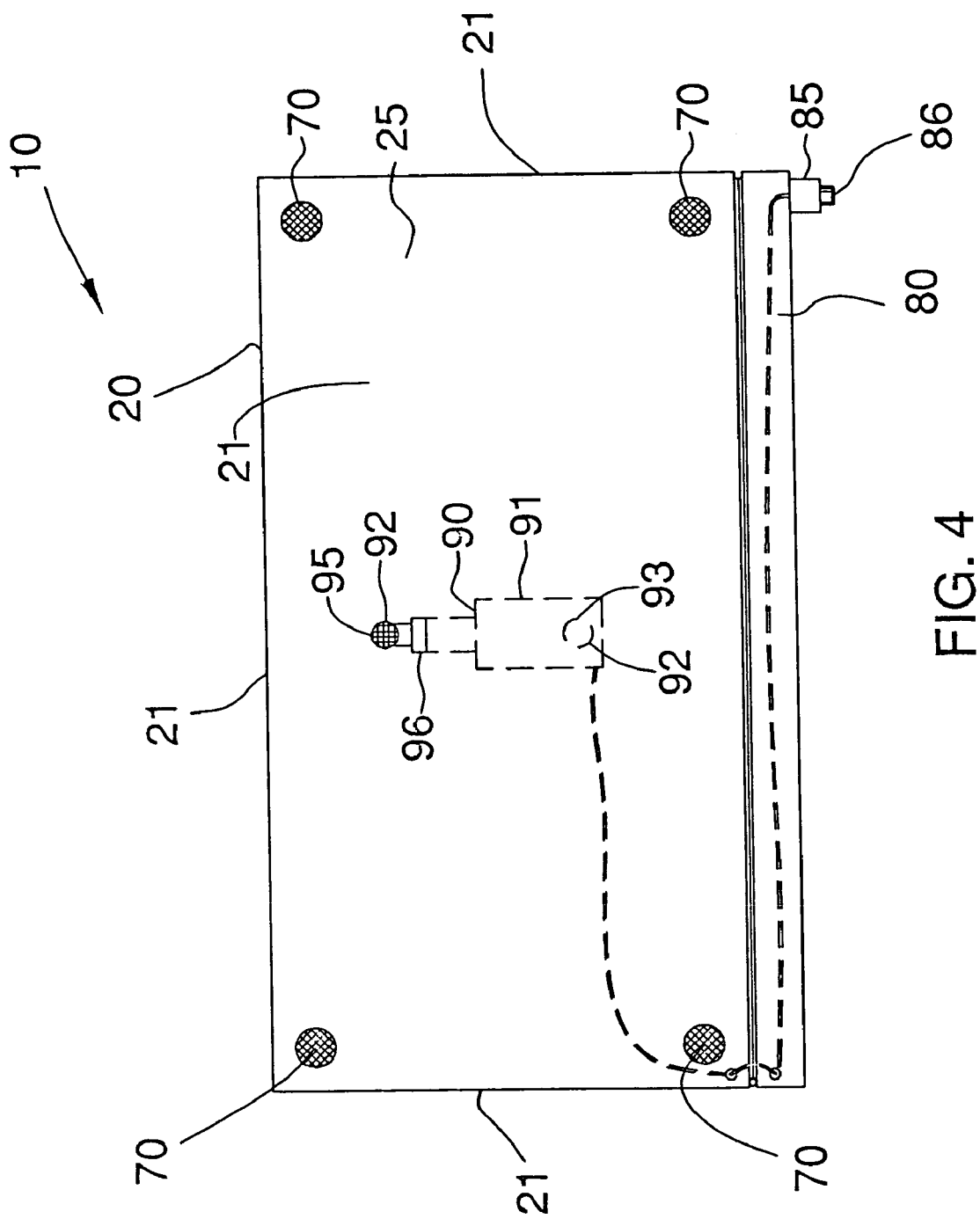
FIG. 4 is an enlarged bottom plan view of the device shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–4 by the reference numeral 10 and is intended to protect a vacuum operable container for storing food. It should be understood that the apparatus 10 may be used to protect many different types of vacuum operable containers.

Referring initially to FIG. 1, the container 10 includes a housing 20 that has a plurality of sidewalls 21 integral with each other and forming a generally rectangular shape. The housing 20 further includes a plurality of interior walls 22 spaced from the plurality of sidewalls 21 for defining a gap 30 therebetween. The gap 30 may partially extend about a perimeter of the housing 20.

The present invention 10 further includes an air pump 40 disposed within the gap 30 and adjacent to the bottom surface 25 of the housing 20. One of the plurality of sidewalls 21 may have an opening 50 formed therein for providing access to the interior of the housing 20. The housing 20 further includes at least one shelf 60 selectively positionable therein for supporting food thereon. The housing 20 includes a plurality of support members 70 formed from rubber material, for example, that may connected to one of the plurality of sidewalls 21 for maintaining the container 10 at a substantially stable position during operating conditions. Of course, other suitable materials may be employed, as well known to a person of ordinary skill in the art.

The container 10 further includes a door 80 having a longitudinal axis (not shown) 81 and a pair of opposed edge portions 82 equally spaced therefrom and extending substantially parallel thereto. The door 80 further has an end portion 83 integral with the opposed edge portions 82 and is pivotally connected to the housing 20 at end portion 83. Such a door includes a rear surface 84 that may be formed from steel so that same can be engage magnetically 86 with the housing. The door 80 may further include a handle 85 connected thereto and extending outwardly therefrom, to which the control button 86 is connected. Advantageously, an operator may easily activate/deactivate the device 10 prior to using same.

The present invention further includes an electrically powered vacuum system 90 connected to the housing 20 for selectively removing air therefrom as desired by a user. The vacuum system 90 includes an air pump 91 and a control button 86 connected thereto for selectively toggling the system 90 between operable and non-operable modes so that a user can simultaneously release the air pressure within the housing 20. The system 90 further includes a plurality of valves 92 connected to the air pump 91 for directing air inwardly and outwardly from the housing 20. The plurality of valves 92 include an intake valve 93 that may have an upper end portion 94 connected to one of the plurality of interior walls 22, and an outlet valve 95 that may have a lower end portion 96 connected to one of the plurality of sidewalls 21. A pressure sensor is also included in the housing 20 and is operably connected to the air pump 91 for identifying the pressure contained within the housing 20.

The appealing features of the container 10 would be its ease of use, simplicity, versatility and ability to help extend the shelf life of a variety of baked and related goods. The container 10 consumes little space on a typical kitchen countertop. Once closed, its air pump 91 automatically removes most of the air from inside the unit, thereby keeping the variety of baked and related goods fresh longer than would otherwise be possible.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. container for storing food in an air-tight atmosphere, said container comprising:
    a housing having a plurality of sidewalls integral with each other and forming a generally rectangular shape, one said plurality of sidewalls having an opening formed therein and for providing access to an interior of said housing, said housing further comprising:
        a plurality of interior walls spaced from said plurality of sidewalls for defining a gap therebetween, said gap partially extending about a perimeter of said housing;
        said air pump being disposed within said gap and adjacent a bottom surface of said housing;
    a door having a longitudinal axis and a pair of opposed edge portions equally spaced therefrom and extending substantially parallel thereto, said door further having an end portion integral with said opposed edge portions, said door being pivotally connected to said housing at said end portion, said door including a rear surface formed from steel and being magnetically engageable with said housing;
    an electrically powered vacuum system connected to said housing and for selectively removing air therefrom as desired by a user, said vacuum system comprising
        an air pump and a control button connected thereto and for selectively toggling same between operable and non-operable modes, and
        a plurality of valves connected to said air pump and for directing air inwardly and outwardly from said housing.

2. The container of claim 1, wherein said plurality of valves comprise:
    an intake valve having an upper end portion connected to one said plurality of interior walls; and
    an outlet valve having a lower end portion connected to one said plurality of sidewalls.

3. The container of claim 1, further comprising:
    at least one shelf selectively positionable within said housing and for supporting food thereon.

4. The container of claim 1, further comprising a handle connected to said door and extending outwardly therefrom, said control button being connected to said handle.

5. The container of claim 1, further comprising a plurality of support members formed from rubber and being connected to one said plurality of sidewalls for maintaining said container at a substantially stable position during operating conditions.

6. A container for storing food in an air-tight atmosphere, said container comprising:
- a housing having a plurality of sidewalls integral with each other and forming a generally rectangular shape, one said plurality of sidewalls having an opening formed therein and for providing access to an interior of said housing;
- a door having a longitudinal axis and a pair of opposed edge portions equally spaced therefrom and extending substantially parallel thereto, said door further having an end portion integral with said opposed edge portions, said door being pivotally connected to said housing at said end portion, said door including a rear surface formed from steel and being magnetically engageable with said housing;
- an electrically powered vacuum system connected to said housing and for selectively removing air therefrom as desired by a user, said vacuum system comprising
  - an air pump and a control button connected thereto and for selectively toggling same between operable and non-operable modes, and
  - a plurality of valves connected to said air pump and for directing air inwardly and outwardly from said housing;
- said housing further including a plurality of interior walls spaced from said plurality of sidewalls for defining a gap therebetween, said gap partially extending about a perimeter of said housing with said air pump being disposed within said gap and adjacent a bottom surface of said housing.

7. The container of claim 6, wherein said plurality of valves comprise:
- an intake valve having an upper end portion connected to one said plurality of interior walls; and
- an outlet valve having a lower end portion connected to one said plurality of sidewalls.

8. The container of claim 6, further comprising:
- at least one shelf selectively positionable within said housing and for supporting food thereon.

9. The container of claim 6, further comprising a handle connected to said door and extending outwardly therefrom, said control button being connected to said handle.

10. The container of claim 6, further comprising a plurality of support members formed from rubber and being connected to one said plurality of sidewalls for maintaining said container at a substantially stable position during operating conditions.

11. A container for storing food in an air-tight atmosphere, said container comprising:
- a housing having a plurality of sidewalls integral with each other and forming a generally rectangular shape, one said plurality of sidewalls having an opening formed therein and for providing access to an interior of said housing;
- a door having a longitudinal axis and a pair of opposed edge portions equally spaced therefrom and extending substantially parallel thereto, said door further having an end portion integral with said opposed edge portions, said door being pivotally connected to said housing at said end portion, said door including a rear surface formed from steel and being magnetically engageable with said housing;
- an electrically powered vacuum system connected to said housing and for selectively removing air therefrom as desired by a user, said vacuum system comprising
  - an air pump and a control button connected thereto and for selectively toggling same between operable and non-operable modes,
  - a plurality of valves connected to said air pump and for directing air inwardly and outwardly from said housing; and
- a plurality of support members formed from rubber and being connected to one said plurality of sidewalls for maintaining said container at a substantially stable position during operating conditions;
- said housing further including a plurality of interior walls spaced from said plurality of sidewalls for defining a gap therebetween, said gap partially extending about a perimeter of said housing with said air pump being disposed within said gap and adjacent a bottom surface of said housing.

12. The container of claim 11, wherein said plurality of valves comprise:
- an intake valve having an upper end portion connected to one said plurality of interior walls; and
- an outlet valve having a lower end portion connected to one said plurality of sidewalls.

13. The container of claim 11, further comprising:
- at least one shelf selectively positionable within said housing and for supporting food thereon.

14. The container of claim 11, further comprising a handle connected to said door and extending outwardly therefrom, said control button being connected to said handle.

* * * * *